United States Patent [19]

Chen et al.

[11] Patent Number: 4,604,247

[45] Date of Patent: Aug. 5, 1986

[54] TOWER PACKING MATERIAL AND METHOD

[75] Inventors: Gilbert Chen, Farmers Branch; B. Layton Kitterman; Donald L. Glaspie, both of Dallas; John R. Axe, Arlington, all of Tex.

[73] Assignee: Glitsch, Inc., Dallas, Tex.

[21] Appl. No.: 725,143

[22] Filed: Apr. 19, 1985

Related U.S. Application Data

[63] Continuation of Ser. No. 506,534, Jun. 21, 1983, abandoned.

[51] Int. Cl.⁴ .............................................. B01F 3/04
[52] U.S. Cl. .................................... 261/94; 29/157 R; 29/163.5 R; 202/158; 261/112; 261/DIG. 72; 428/182; 428/596; 428/597
[58] Field of Search ....................... 261/94-98, 261/100, 112, 114 JP, DIG. 11, DIG. 72; 210/150, 151; 202/158; 29/157 R, 6.1, 163.5 R, 29/163.5 F; 156/510; 165/166, 60; 55/241; 428/596, 597, 182; 422/211, 222

[56] References Cited

U.S. PATENT DOCUMENTS

| | | | |
|---|---|---|---|
| 2,206,440 | 7/1940 | Walker | 261/112 |
| 2,470,652 | 5/1949 | Scofield | 261/100 X |
| 3,013,781 | 12/1961 | Haselden | 261/112 |
| 3,084,918 | 4/1963 | Kohl et al. | 261/DIG. 11 |
| 3,155,153 | 11/1964 | Axelsson | 261/112 X |
| 3,206,536 | 9/1965 | Goodloe | 29/6.1 X |
| 3,346,246 | 10/1967 | Loetel et al. | 261/DIG. 11 |
| 3,603,129 | 9/1971 | Williams et al. | 29/163.5 R X |
| 3,645,830 | 2/1972 | Warp | 29/163.5 R X |
| 3,785,620 | 1/1974 | Huber | 261/112 X |
| 4,036,917 | 7/1977 | Slobodyanik | 261/114 JP |
| 4,296,050 | 10/1981 | Meier | 261/112 |
| 4,356,611 | 11/1982 | Chen et al. | 29/163.5 R X |
| 4,501,707 | 2/1985 | Buhlmann | 261/112 X |

FOREIGN PATENT DOCUMENTS

| | | | |
|---|---|---|---|
| 1283250 | 11/1968 | Fed. Rep. of Germany | 261/112 |
| 2032292 | 4/1971 | Fed. Rep. of Germany | 261/112 |
| 2601890 | 7/1971 | Fed. Rep. of Germany | 261/112 |
| 2060178 | 11/1971 | Fed. Rep. of Germany | 261/112 |
| 843119 | 8/1960 | United Kingdom | 261/112 |
| 1202704 | 8/1970 | United Kingdom | 261/112 |
| 1245938 | 9/1971 | United Kingdom | 261/112 |

*Primary Examiner*—Richard L. Chiesa
*Attorney, Agent, or Firm*—Thomas L. Cantrell; Stanley R. Moore

[57] ABSTRACT

Metal vapor-liquid contact plates disposed in face-to-face contact with respective corrugations inclined to the horizontal across an open notional plane. The metal packing is disposed within a vapor-liquid contact column for the purpose of bringing about mass and heat transfer between liquid and vapor passing in opposite directions therethrough. The body portion of each metal plate comprises metal that has been slitted to provide both surfaces thereof with a very large number of apertures with little wasted material. The metal lands defining the apertures are, moreover, twisted and angulated. The apertures in the plates also trap liquid and expose it to the vapor stream on both sides of the metal affording self-spreading of the liquid and turbulent vapor flow therethrough. In this manner, the assembly affords optimal pressure drop characteristics, surface to vapor passage area ratio, and vapor-liquid distribution characteristics. The laminate plate formation may also afford select flow and turbulence characteristics through capillary action between offset laminate land areas of the corrugated sheets.

18 Claims, 20 Drawing Figures

TOWER PACKING MATERIAL AND METHOD

CROSS-REFERENCE TO RELATED APPLICATION

This application is a continuation of application Ser. No. 506,534, filed June 21, 1983, now abandoned.

BACKGROUND OF THE INVENTION

1. Field of the Invention

The present invention relates to vapor-liquid contact packing and, more particularly, to corrugated contact plates disposed in face-to-face contact for use in vapor-liquid process towers.

2. History of the Prior Art

In the vapor-liquid contact art, it is highly desireable to utilize methods and apparatus that efficiently improve the quality as well as the quantity of the mass heat transfer occurring in process towers. The technology of such process towers is replete with material designs used for tower packing. The type of packing is a function of the particular process to be effected within the tower. The packing elements may comprise a structured grid array (grid packing) arranged to form a regular array inside the column or may comprise oblique shapes dumped into and randomly arranged (dump packing) within the tower. Close fractionation and/or separation of the feed stock constituents introduced into the tower and the elimination of harmful or undesirable residual elements imparts criticality to the particular vapor-liquid contact apparatus designed. The shape of the dump packing elements determines the flow pattern in and density of the array and the resultant resistance to flow caused thereby. Prior art grid arrays have thus found utility in a variety of shapes, sized and material forms in both structure arrays and dump packing configurations.

It has been found particularly desirable in the prior art to provide apparatus and methods affording efficient heat transfer and fluid vaporization, or vapor condensing whereby cooling of one of the fluids can be accomplished with a minimum pressure drop through and in a zone of minimum dimensions defining its area and volume. High efficiency, low pressure drop and reduced temperatures are most often found as design criteria in the chemical engineering art particularly applied to petroleum refraction operations. Process towers for effecting such chemical reactions are generally of the character providing descending fluid flow from an upper portion of the tower and ascending vapor flow from a lower portion of the tower. Sufficient surficial area for vapor-liquid contact is necessary for the primary function and the reduction or elimination of liquid entrainment present in the ascending vapor. Most often it is necessary for the grid array to have sufficient mass and surficial area in both its horizontal and vertical planes so that fractions of the heavy constituents are conducted downwardly in condensed form and the vapors are permitted to rise through the grid with minimum impedence. With such apparatus, undesirable solids or heavy constituents of the feed stock are removed by the coaction of the ascending liquid vapor to provide a self-cleaning grid.

Generally, a plurality of stacked layers affording compatible and complemental design configurations for a particular application are assembled within a single column. Each layer utilizes the velocity and kinetic energy of the ascending vapors to perform the dual function of eliminating liquid entrainment in the ascending vapor and the thorough and turbulent contacting of the vapor with the descending liquid to accomplish sufficient separation, or fractionation, of the fluids into the desired components. Quick cooling of the ascending vapor is generally a prerequisite for efficient operation to effect efficient heat transfer for vapor condensation and minimum pressure drop in a minimum vertical depth of the grid. Oppositely inclined corregated plates have thus been utilized in the prior art for affording multiple vapor passages through the horizontal and vertical planes of the grid layers. Such complex flow patterns insure the flow of vapors and the distribution thereof within the layers which prevents maldistribution or a channeling of the vapor through only certain portion of the layers and not others. Only in this manner is efficient and effective utilization of the column and the energies applied therein effected.

Prior art structures often incorporate a plurality of layers with the grid members of each layer having angularly disposed elements in contiguous contact. Each element generally has a structural configuration and angularity that permits a large upright vapor passage area in excess of fifty percent of the horizontal area of the layer. This design usually affords acceptable efficiency and vapor-liquid distribution for heat mass transfer. Such structures also by necessity provide thorough and turbulent mixing or contacting of ascending vapor and descending liquid without materially displacing either the vapor or liquid from its vertical location or flow within the grid. Such displacement would cause maldistribution or channeling of either the vapor or the liquid through certain portions of the grid or its layers, which would reduce efficiency.

The structural configuration of oppositely inclined corrugated plates of the prior art often incorporate vapor passages such as plate orifices whereby turbulence is enhanced. The orifices insure intimate vapor-liquid contact and are often comprised of simple holes punched in the plates. It is nececessary to insure the acsending vapor performs a dual function of liquid contact and liquid disentrainment within close proximity to the vertical location at which the ascending vapor approaches or leaves the vapor passage orifices. In this manner, maldistribution of the ascending vapor or descending liquid is prevented. It is, moreover, of tantamount concern in the prior art to provide such methods and apparatus for vapor-liquid contact in a configuration of economical manufacture. Such considerations are necessary for cost effectiveness.

Oppositely inclined corrugated plates provide but one method and apparatus for countercurrent, liquid-vapor interaction. With such grid arrays, the liquid introduced at or near the top of the column and withdrawn at the bottom is brought into contact with vapor being introduced at or near the bottom of the column and withdrawn at the top. The critical feature in such methods and apparatus is to insure that the liquid and vapor achieve the desired degree of contact with each other so that the planned reaction occurs at the designed rate within controlled parameters of mass and heat transfer. The internal structure is, of course, passive in the sense that it is not power driven and has few or no moving parts. The prior art is thus replete with such passive vapor-liquid contact devices utilizing cross-fluted and perforated sheets of material in face-to-face engagement for encouraging the liquid moving through to form itself into thin films. The films have, in the aggregate, a large area over which to pass for the vapor flowing through the corrugations to engage. But the design problem is not merely a matter of providing a large surface area or a multitude of corrugations, cross-flutes, or perforations. A number of other interrelated considerations must be taken into account, some of which have been mentioned above, but which determine operational efficiency and operational effectiveness.

From a process standpoint, it is important that the desired vapor-liquid contact reaction be carried as close to completion as possible. For example, in a crude oil vacuum tower, close fractionation and good separation are needed to produce gas oil streams that are free of undesirable residual elements. As mentioned above, the contact column in its internal apparatus must thus utilize the heat supplied to the unit efficiently. In this manner it minimizes direct operating costs. This is true whether the reaction is mass transfer, heat transfer, liquid-vaporization or vapor condensing duty. With the above considerations, pressure drop is a primary consideration as is the vapor-liquid fluid interface. Such grids for vapor-liquid contact have been shown in the prior art in such references as U.S. Pat. No. 3,343,821, issued Sept. 26, 1967; U.S. Pat. No. 4,139,584, issued Feb. 13, 1979; U.S. Pat. No. 4,128,684, issued Dec. 5, 1978; U.S. Pat. No. 3,785,620, issued Jan. 15, 1974; and U.S. Pat. No. 3,959,419, issued May 25, 1976. In these vapor-liquid contact method and apparatus references, a plurality of design configurations are presented for affording intimate vapor-liquid contact. In particular, stacked corrugated contact plates in face-to-face contact having corrugations inclined to the horizontal and/or orthogonal one to the other have been shown. These plates have also been provided in various material configurations, including monofilament yarns, and solid plates. It is moreover prominent in the prior art to utilize cross-fluted plates having a myriad of perforations therethrough for improved effectiveness.

While the methods and apparatus set forth above for vapor-liquid contact have been shown to be effective, certain disadvantages yet remain. In particular, vapor-liquid contact towers incorporating descending liquid flow and ascending vapor flow of the passive grid variety defined above, is generally incapable of self-regulation of internal pressure differentials. Moreover, non-homogenous vapor-liquid flow across the grid surface area is prevalent and leads to a reduction in mass heat transfer and operational efficiency. Even with a plurality of apertures disposed between substantially planar and/or cross-fluted plates of the prior art variety, vapor flow is ultimately sensitive to pressure differentials.

Pressure differentials in process columns are often imparted due to non-turbulent vapor flow and non-homogenous flow patterns through the grid structure. When vapor flow is laminar through a first fluted column and turbulent in an area around a second adjacent fluted column pressure differentials are imparted. Even when the corrugations or cross-fluted areas of adjacent plates are inclined to relatively sharp angles, one to the other, vapor flowing along any one corrugation is exposed along over fifty percent of the sidewall having substantially solid surface and a plurality of major openings defining flow channels along the second wall section thereof. Turbulence in an adjacent section, therefore, directly affects the laminar flow and imparts pressure differentials. Turbulence along all channels and all adjacent openings provides uniformity and less propensity for fluid displacement and maldistribution or channeling of either the vapor or the liquid through certain portions of the grid or its layers. Such dynamic action directly affects efficiency and mass heat interaction.

Vapor and liquid flow in the above prior art configurations has been shown to be susceptible to random flow patterns which cannot be accurately determined within the passive grid of most prior art designs. The absence of any substantial degree of uniformly imparted turbulence through the adjacent corrugations and fluted areas decreased the uniformity and homogeneity of the flow pattern throughout the grid and the programmed efficiency and mass heat transfer characteristics capable of predefined grid structures with known flow characteristics. Moreover, the utilization of random apertures between face-to-face corrugations and/or fluted plates has limited effectiveness due to the planar liquid and vapor flow adjacent thereto. The apertures are, in effect, planar voids within a substantially planar flow area which imparts little direct turbulence to either the vapor or liquid. For this reason, packing elements made of foil-like material having alternating smooth and finely fluted portions such as that shown in U.S. Pat. No. 4,186,159 have been utilized in the prior art. The packing elements set forth in the above patent incorporate a plurality of corrugated plates spirally wound from a continuous strip to form an ordered packing with a plurality of apertures formed therethrough. The flow distribution is improved along the cross-fluted areas but not uniformly across the entire surface of the corrugated plate. Moreover, the fluid flowing on one side is substantially confined to a single side of the plate rather than being dispersed through to the other side as would be advantageous in maximum efficiency and maximum exposure of the liquid to a vapor flow in a turbulent region.

It would be an advantage, therefore, to overcome the problems of the prior art by incorporating the advantages of face-to-face corrugated and fluted contact plates with the utilization of a plate material imparting both vapor and fluid turbulence and fluid vapor interchange for maximizing efficiency. The expanded metal packing and method of manufacture set forth in the present invention provides such a packing with enhanced vapor-liquid contact without adversely affecting the operational characteristics or adding to pressure losses therethrough. The methods and apparatus of the present invention provide such an improvement over the prior art grid by providing an expanded metal plate of twisted lands defining a myriad of aperatures therebetween in a corrugated configuration. The corrugated plates are assembled in face-to-face relationship with the corrugation angle facing opposite directions along the notional separation plane therebetween. The presence of the twisted metal lands defining the apertures therebetween permit the formation of turbulent liquid flow thereover and through the plate whereby both sides are substantially filmed over by the descending liquid flow. The ascending vapor flow is further enhanced by the turbulence imparted thereto by the corrugated expanded metal. Such vapor-liquid flow configurations are, in effect, maximum utilization of process tower technology. This is made possible by providing a myriad of narrow, twisted flow channels for the fluid to be dispersed along through opposite sides of the corrugated plates. The expanded metal affect such flow while simultaneously imparting turbulence to the otherwise laminar vapor flow along the plate, whereby the vapor and fluid are induced to flow along and through the expanded metal surface for maximum exposure of the surface areas of both.

SUMMARY OF THE INVENTION

The present invention relates to vapor-liquid contact towers and grids array disposed therein for affording vapor-liquid contact. More particularly, one aspect of the present invention comprises expanded metal vapor-liquid contact plates disposed in face-to-face contact with respective corrugations inclined to the horizontal. The expanded metal packing is disposed within a vapor-liquid contact column for the purpose of bringing about mass and heat transfer between liquid and vapor passing in opposite directions therethrough. The body portion of each expanded metal plate comprises metal that has been slitted and expanded by stretching along oppositely oriented axes. The expansion and corrugation of the metal provides both surfaces thereof with a very large number of apertures without any wasted material. The metal lands defining the apertures are, moreover, twisted and angulated relative to both the apertures and one another through the expanded expansion and corrugation forming process to provide a complex laminar flow network which, from the vapor point of view, is substantially equivalent to a turbulent flow relative to mass and heat transfer characteristics. The apertures in the plates also trap liquid and expose it to the gas stream on both sides of the expanded metal which, due to its surface characteristics, will wet on opposite sides simultaneously and impart a convoluted flow pattern throughout the expanded grid matrix affording self-spreading of the liquid and turbulent vapor flow therethrough. In this manner, the assembly affords optimal pressure drop characteristics, surface to vapor passage area ratio, and vapor-liquid distribution characteristics in an economically producable assembly. Variations in the corrugation size and material thickness as well as expansion ratio can afford selectability in vapor-liquid efficiency and operation. The laminate plate formation may also afford select flow and turbulence characteristics through capillary action between offset laminate land areas of the corrugated sheets.

In another aspect the invention includes tower packing comprising a plurality of sheets with a plurality of corrugations formed on each sheet. The sheets are disposed in face-to-face contact with the corrugations of each sheet extending at an angle to the corrugations of its adjacent sheets to define flow paths for a descending liquid and an ascending vapor. A plurality of relatively large orifices are formed through and spaced apart by solid surfaces of each sheet for permitting passage of the liquid and vapor therethrough to distribute the liquid over the sheets and equalize the pressure of the vapor. A plurality of relatively small elongated slits are formed through the solid surfaces of each of the sheets with the slits in each sheet being spaced longitudinally from each other in parallel rows extending transversely across the corrugations and a portion of each sheet adjacent each slit being displaced from the plane of the sheet to enhance vapor-liquid contact along the sheets.

BRIEF DESCRIPTION OF THE DRAWING

For a more complete understanding of the present invention and for further objects and advantages thereof, reference may now be had to the following description taken in conjunction with the accompanying drawing in which.

DETAILED DESCRIPTION

Figure 1:
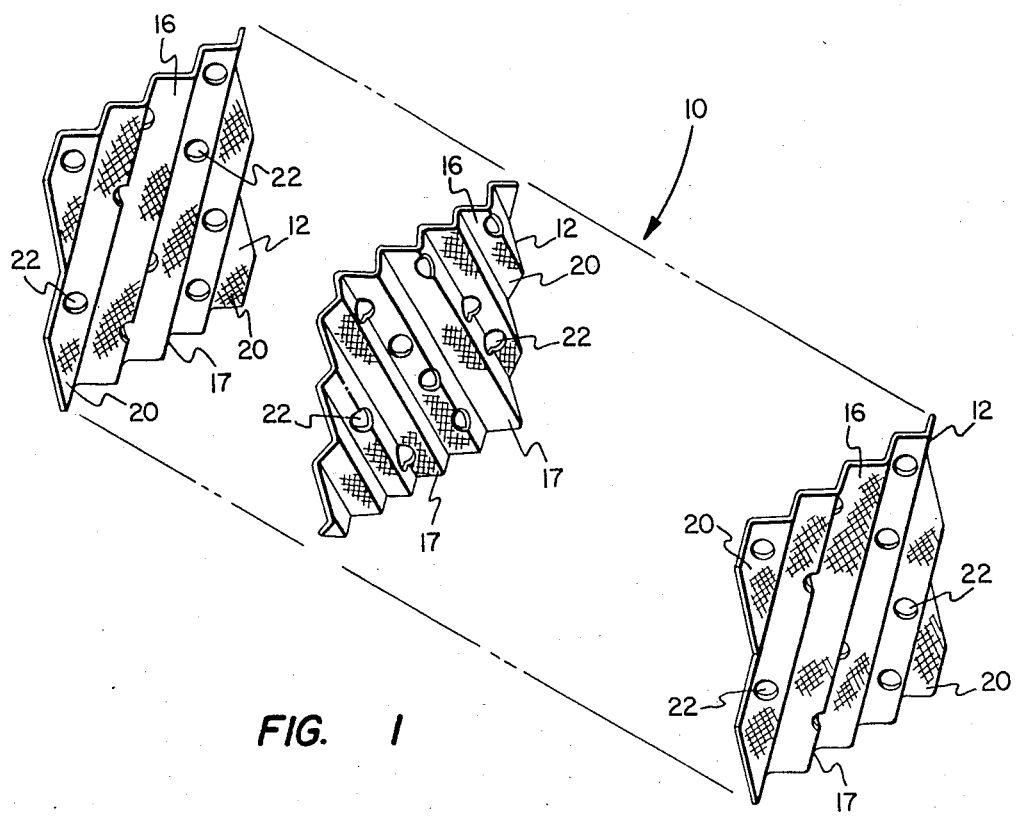
FIG. 1 is an exploded perspective view of one embodiment of the methods and apparatus of the invention, illustrating a plurality of corrugated expanded metal plates being assembled one against the other.

Referring first to FIG. 1 there is shown an exploded perspective view of a series of expanded metal plates of a packing element assembly constructed in accordance with the principles of the present invention. The assembly 10 comprises a plurality of expanded plate member 12 stacked in contiguous face-to-face relationship, between which vapor and liquid are subject to counter-current flow for imparting mass and heat transfer therebetween. The manner in which the vapor and liquid flow is directed between the respective plates directly affects the vapor liquid contact, the efficiency of the operation, and forms the subject of the present invention.

The plates 12 of assembly 10 include corrugations 14 having a plurality of flow troughs or channels 16 defined between the respective corrugations crests or ridges 17 disposed thereacross in generally parallel, spaced relationship. The corrugated members 14 are positioned in face-to-face relationship one with the other with adjacent sheets preferably angulated relative to one another. In this manner vapor ascending through the stacked grid assembly 10 and passing through the corrugation channels 16 are exposed to the curved or folded sidewall surface areas of the corrugated plates 14.

Still referring the FIG. 1, the expanded metal corrugated sheets 14 illustrated therein comprises a plurality of expanded metal apertures 20 for creating a complex pattern of vapor and liquid flow over and through the sheet 14 and adjacent corrugation ridges 17. In this manner vapor ascending through the stacked grid assembly 10 and passing through the corrugation channels 16 may be exposed concurrently to the angled sidewall surface areas of the corrugated lamella 14 as well as the intermediate sidewall areas of the apertures 20. The notional plane between adjacent corrugated plates 14 may also include a lamella for further fluid transfer as set forth in co-pending U.S. patent application Ser. No. 725,144 and assigned to the assignee of the present invention. The apertures 20 formed within the sheet 14 traps, diverts and establishes a plurality of thin liquid transfer points during descending fluid flow. The fluid upon the sheet 14 is then exposed on two sides to opposite vapor flow patterns to maximize the efficiency of the mass heat transfer with a minimum of pressure loss and energy input.

Still referring to the embodiment of FIG. 1, the corrugated sheet 14 illustrated therein further includes a series of relatively large orifices 22. The orifices 22 afford venting between adjacent corrugations channels 16 for vapor pressure equalization and liquid flow diversion. Such vapor pressure considerations are important for establishing a homogeneous flow through the grid assembly 10 under tower operating conditions, to be defined in more detail below. Liquid descending through the grid assembly 10 is optimally spread across the material surface area including the sidewalls of the corrugation channels 16. The liquid entrained within the apertures 20 then comprise a relatively thin liquid volume enhancing exposure and vaporization to the passing vapor flow. This effect maximizes efficiency of the grid operation.

Figure 2:
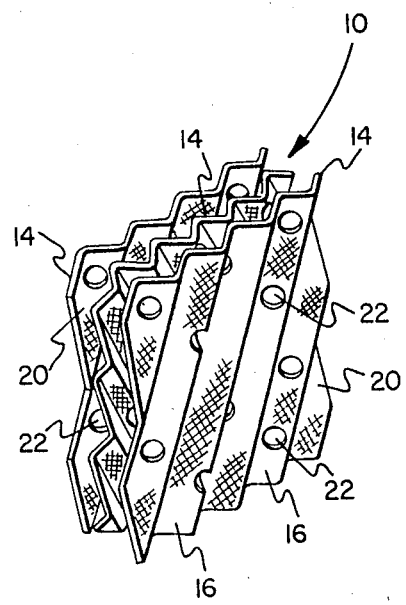
FIG. 2 is a perspective view of the vapor-liquid contact grid assembly illustrated in FIG. 1 in an assembled configuration.

Referring now to FIG. 2 there is shown a perspective view of the grid 10 of FIG. 1 in an assembled configuration. The grid 10 shown herein comprises only a portion of a grid layer for use in a process tower as will be described in more detail below. It may be seen that the adjacent corrugated plate members 14 are stacked against one another in engagement across the corrugation edge portions 12. A plurality of flow channels 16 are thus formed in the grid 10, which channels 16 are relatively open across the notional plane between contiguous members 14. As shown herein, opposite ones of the corrugated plate members 14 are oriented oppositely, one to the other, for providing an opposed flow of vapor and liquid across the intermediately disposed plates.

Figure 3:
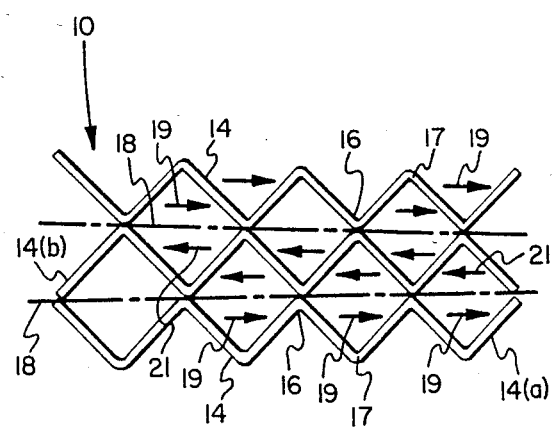
FIG. 3 is an enlarged top plan view of the vapor-liquid contact grid of FIG. 2.

Referring now to FIG. 3, there is shown a top plan view of the assembled grid section 10 of FIG. 2. It may be seen that a notional plane 18, shown in phantom lines, separates the adjacent corrugated plates 14. Vapor flowing in the respective channels 16 of each plate 14 passes upwardly and at the angle of the corrugation ridges 17. Because contiguous plates 14 are angled oppositely, one to the other, (as shown in FIG. 1), the direction of upward vapor flow of said contiguous plates is laterally opposite. Flow arrows 19 and 21 illustrate this point. Lamella 14(a) imparts a lateral flow to the right as viewed in FIG. 3, while lamella 14(b) imparts a lateral flow to the left. Since the notional plane 18 is open between said lamella, both advantageous and disadvantageous flow results can arise. One solution to flow problems is set forth in said copending patent application Ser. No. 725,144 wherein a sheet is placed across the notional plane 18. The sheet across the notional plane affords defined fluid flow and fluid sheeting along both sides of the plate. It may also be seen that the area of fluid flow along the notional plane comprises the greatest single wall area defined by a corrugated section 15. This condition holds true for all corrugated wall sections 14 formed with an angle of 60° or less. For corrugations 16 formed at an angle greater than 60°, the sheet disposed across the notional plane would be of less size than the "V"-shaped corrugation sidewalls. However, such a corrugation angle is not frequently incorporated due to the increase in material cost weight and altered process characteristics within a column.

It has thus been found to be most desirable to incorporate corrugations having an angle of formation less than 60° for maximum efficiency in vapor liquid contact. In such configurations, the sheet disposed in the notional plane between adjacent corrugated plate members 14 provides not only the maximum wall surface area for each flow channel but further increases the number of connecting flow points within the grid assembly 10. For example, the sheet is sandwiched between adjacent corrugated plates 14 so that the edges 17 of each engage the sheet continuously therealong. This continuous engagement strip affords an elongated series of contact points across which fluid flow can migrate and vapor-liquid contact can be enhanced. Moreover, the inner section of the sheet and the corrugation edge 17 form a narrow, elongated, corner 23. The surface tension of liquid causes the descending fluid to form in the corners 23 along the plate intersections and thus establish a channel of flow that can continuously feed flow to other areas of the sheet 18 and corugated plates 14. Such feed flow lines along both edges of the corrugation channel 16, as shown in FIG. 3, is highly desirable and may be shown to be an effective way of providing homgeneous liquid flow throughout the grid 10.

Still referring to FIG. 3, the present invention addresses the inefficiencies of prior art designs utilizing angled corrugation plates 14 by providing said plates in select expanded metal configuration. This approach addresses the flow problems of our "open" notional plane by providing enhanced fluid sheeting and localized turbulence within the corrugations 14. The expanded metal sheets present a pattern of twisted lands and apertures to the countercurrent fluid flow which imparts circular and twisted patterns of fluid and vapor flow and enhances the vapor-liquid contact within the corrugation channels 16. The full sheeting and circulation of the liquid and vapor against the expanded metal walls assists in containing the vapor-liquid interaction therealong even with the vapor flow exposed to the open notional plane, as will be described in more detail below.

Figure 4:
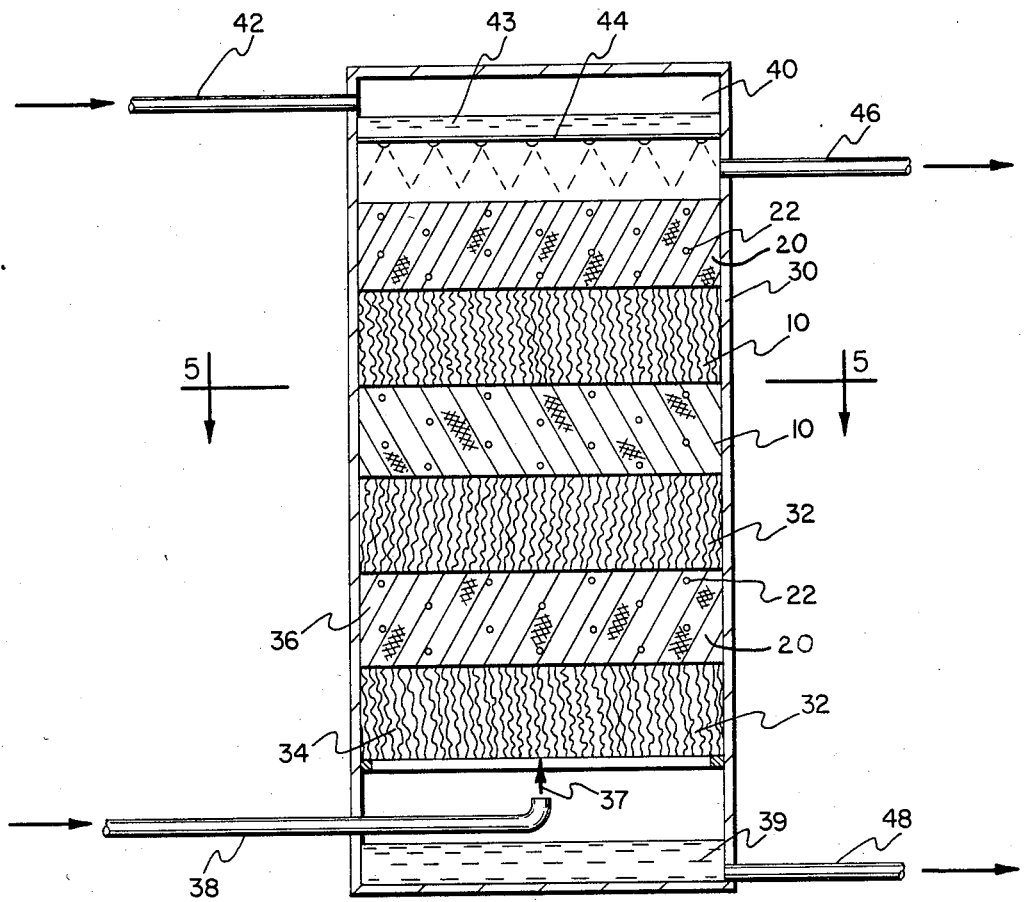
FIG. 4 is a side-elevational, cross-sectional view of a process tower having stacked therein a plurality of layers of the contact grid illustrated in FIG. 2 and incorporating one embodiment of the methods and apparatus of the present invention.

Referring now to FIG. 4, there is shown a side-elevational, cross-sectional view of a process column 30 with stacked grid arrays 10 constructed in accordance with the principles of the present invention. Grid layers 32 are comprised of a plurality of plate sections such as that shown in FIGS. 2 and 3. The outer periphery of the multiple layers is contoured to fit within the process tower 30 which, in the present embodiment, is circular in cross-section. Adjacent grid layers 32 within the column are preferably oriented orthogonally one to the other to further enhance the vapor-liquid contact and turbulence of fluids passing therethrough.

Still referring to FIG. 4, a first grid layer 34 is thus shown adjacent a second, upper grid layer 36 oriented orthogonally to the first whereby the sheet perforations including the orifices 22 and the expanded metal apertures 20 in the sheets 14 of the upper layer 36 are illustrated in contrast to the edge portions of the sheet members 14 of said lower grid layer 34. The column is constructed for affording the entry of vapor 37 through a lower vapor flow line 38 positioned near the bottom 39 of the column. The upper region 40 of the tower 30 is likewise fitted with a liquid flow line 42 for affording the ingress of the liquid 43 to be processed within said column. The liquid entry from the fluid flow line 42 is dispersed across the upper grid layers 32 by spray or dispension heads 44 to initiate homogeneous, descending liquid flow patterns across the stacked grids 10. Similarly, the vapor 37 is introduced in the lower regions 39 of the column for homogeneous distribution therearound and the ascension thereof through the stacked grid layers 32 for heat and/or mass transfer with the descending liquid 43. The vapor 37 is vented near the top of the colum 30 through exhaust line 46 while the excess liquid 43 collected at the bottom of said column is permitted to drain through line 48. The technique of such column operation is well known in the prior art and is, for example, set forth and shown in U.S. Pat. Nos. 3,959,419 and 3,969,447, both of which are assigned to the assignee of the present invention.

Figure 5:
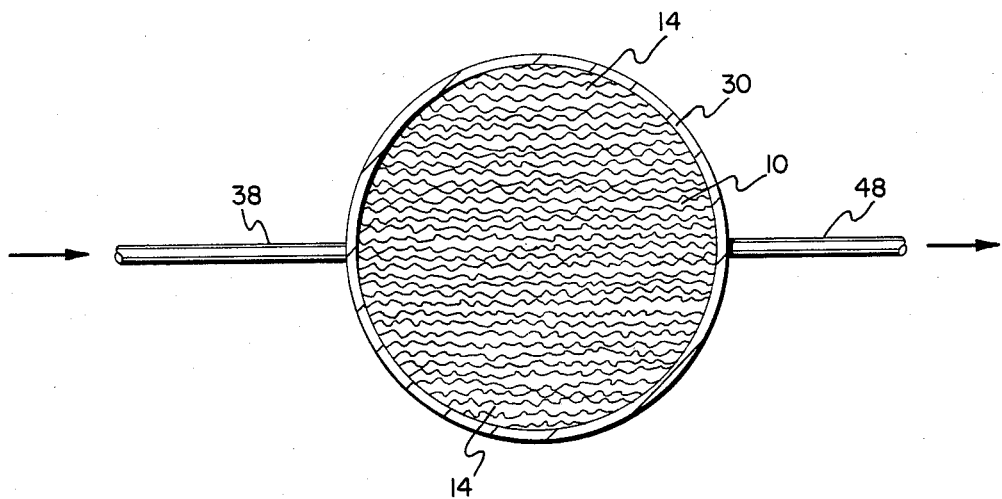
FIG. 5 is a top plan, cross-sectional view of the process tower of FIG. 4 taken along lines 5—5 thereof.

Referring now to FIG. 5, there is shown a top plan view of the column of FIG. 4 taken along line 5—5 thereof. The flow lines 38 and 48 are shown in conjunction with the assembled grid layers. The grid layer 32 is shown in cross-section and comprises a circular body having a plurality of stacked plates 14 and sheets 18 in face to face engagement thereacross. The construction and assembly considerations for conventional column packing grids and the operation thereof is a well known technology of the prior art. The present invention, however, comprises a grid 10 which goes beyond the prior art approaches to the counterflow method and apparatus for vapor-liquid contact for enhanced operation.

Figure 6:
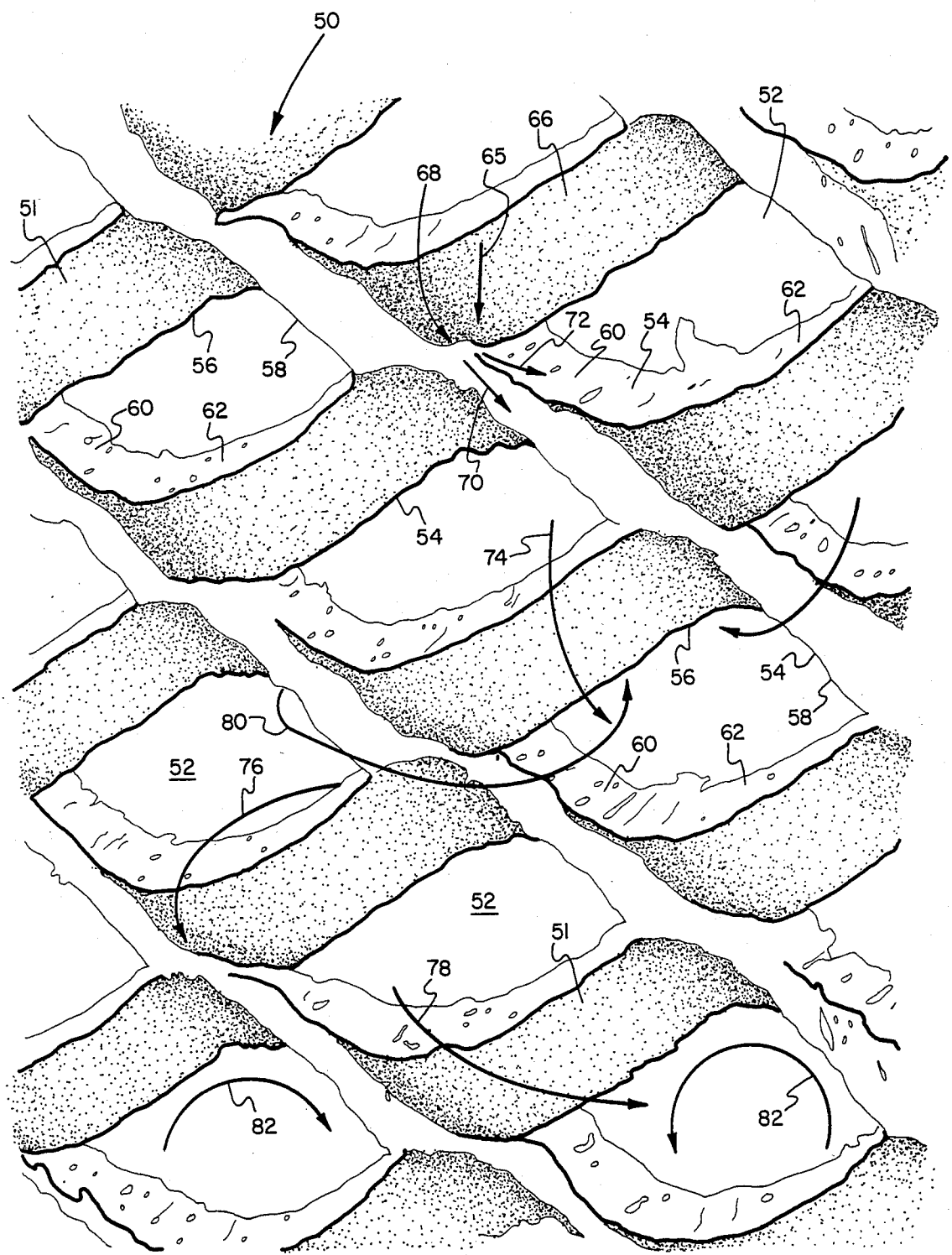
FIG. 6 is an enlarged fragmentary, from elevational view of an expanded metal lattice comprising a portion of one embodiment of a contact plate of the present invention and illustrating the interrelated flow network therein.

Referring now to FIG. 6, there is shown an enlarged front elevational fragmentary view of one embodiment of the corrugated flow plate 14 of the present invention. The plate 14, formed of expanded metal is shown in a magnified view which illustrates the fluid flow patterns which occur thereacross. The expanded metal body, or lattice 50, is comprised of an interconnected series of twisted and deformed lands 51 defining generally rectangular apertures 52 therebetween. Each twisted land 51 is comprised of four elongated sidewall surfaces 54. The four surfaces 54 are bent and twisted during plate formation to afford an interconnected flow path of varying degrees of angulation and inclination relative to the vertical fluid flow. The twisted land portions are also capable of carrying fluid and vapor flow from one side of the corrugated plate 14 to the other during vapor fluid flow thereacross.

The sidewall surfaces 54 of the expanded metal lattice 50 each comprise a first upper face 56, a second lateral face 58, a first bottom side face 60, and a bottom face 62. The various surfaces 54 are shown most clearly in FIG. 6 and are generally rough and pitted due to the method of formation. The faces 56, 58, 60 and 62 are curved and twisted both into and away from the opposite sidewalls of the plate 14 whereby fluid flowing therealong is diverted onto various ones of the flow faces and, in some instances, transferred to the opposite side of the expanded lattice 50. Because the surface is made of metal, wetting is facilitated, and laminar fluid filming thereacross is enhanced by the twisted fluid flow path over the surfaces of each of the angled lands 51. The curved and jagged formation of land faces 56, 58, 60 and 62 further serves to disturb laminar vapor flow across the plate 14 for imparting turbulence thereto and exposing the descending liquid flow to the turbulent vapor for improved mixing.

Still referring to FIG. 6, there is shown a typical flow pattern designated by arrows 65 whereby the flow of descending liquid 43 may be viewed relative to the flow path of ascending vapor 37. A typical flow pattern of descending liquid 43 brings it down a first land 66 where it is separated along an interface 68 between side land 69, along arrow 70, and bottom face 60 along arrow 72. The liquid 43 flows in a film across both surfaces and may be carried to the opposite side of the lattice 50. This is one of a myriad of flow patterns. The fluid flowing along the lands 51 intersects and merges with the flow from adjacent lands 51 from the opposite side of the lattice 50, and from surfaces 54 of apertures 52. The flow patterns can thus form swirls of liquid flow as shown by arrows 74, 76, and 78. The swirls of arrows 74 and 78 indicate liquid circulating around lands 51, which flow is highly advantageous for effective vapor-liquid engagement.

Still referring to FIG. 6, the pitted and jagged metal surface areas are typical of expanded metal which is deformed beyond its point of elastic deformation to take a plastic set in the select expanded and corrugated configuration. The jagged edges may be seen to impart turbulence to both the countercurrent vapor and liquid flow patterns. In this manner, maximum heat-mass transfer through the vapor-liquid flow is effected. Vapor turbulence also effects the liquid flow and another flow pattern of circular liquid flow 80 around the lands of adjacent apertures 52 may be established. Circular liquid or vapor flow may also be created in the pattern of arrows 82 due to the turbulence and flow channeling features of the expanded metal lattice 50 which, in conjunction with its angulation relative to an adjacent corrugated lattice, affords directionality to the ascending vapor 37. This condition creates circulating vapor and/or liquid flow regions passing between adjacent apertures 52. Such circular flow comprises maximum turbulence and greatly facilitates mass transfer particularly in the condition of an "open" notional plane between adjacent plates 14. Vaporization of the descending liquid in any particular area is readily replenished from the convoluted, interconnected flow patterns afforded in the present invention. This aspect, in conjunction with the wetting parameters of the metal, greatly enhances the operational characteristics of the present invention. Moreover, the expanded metal is capable of relieving residual stress during formation to reduce the propensity of corrosion often found in cold formed metal packing elements of conventional prior art designs. Residual stress is a known factor of corrosion when such metal bodies are exposed to many of the standard corrosive chemicals commonly utilized in fractionation processes in such stacking columns.

Figure 7:
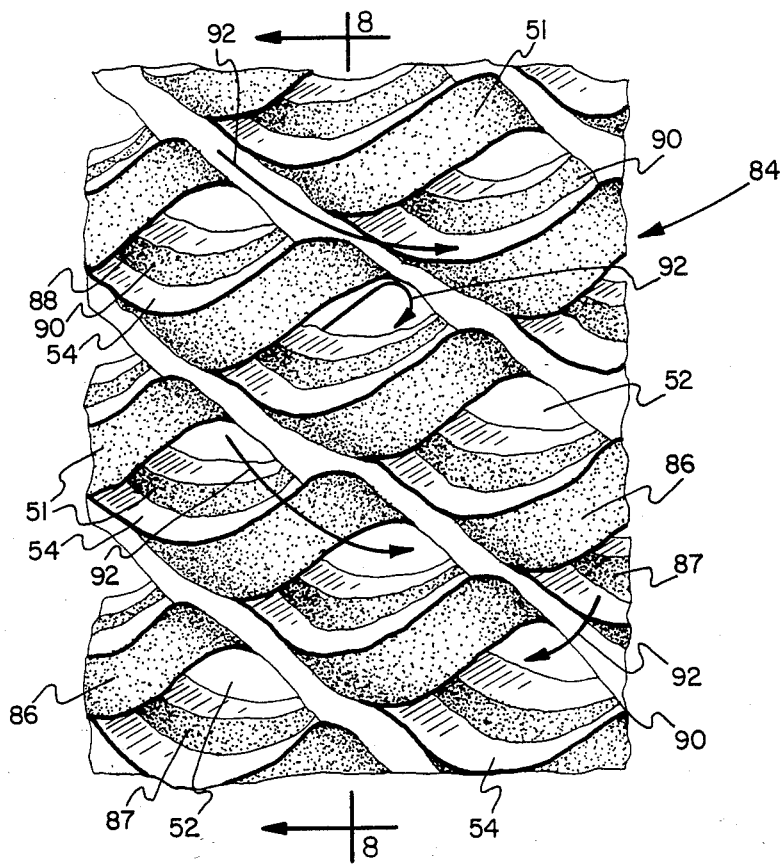
FIG. 7 is an enlarged, fragmentary front-elevational view of an alternative embodiment of the expanded metal lattice of FIG. 6.

Referring now to FIG. 7, there is shown an alternative embodiment of an expanded metal corrugated lattice 50 constructed in accordance with the principles of the present invention. Lattice 84 is constructed from a pair of expanded metal blanks 86 and 87 laminated one to the other whereby the sidewall configuration of the resulting apertures 52 includes an offset wall region 88 with an abutment channel 90 formed therearound. The channel 90 is comprised of the intersection of the sidewalls 54 and land 51 of the respective expanded metal laminants 86 and 87. The channel 90 traps liquid 43 flowing therearound through capillary action or the like. The entrained liquid 43 within the laminate wall region 90 affords numerous advantages in vapor-liquid contact by presenting a liquid surface integral with the expanded metal plate, which liquid is actually retained by capillary action. The corrugation formation of the plate 84 further deforms and offsets the wall region due to natural expansion properties. This deformation further enhances the entrapment channel configuration. Sheets of slitted or slotted metal expanded into the plate configuration shown herein will thus provide vastly improved liquid entrainment properties, which entrainment may be seen to be typical of the entire land region surrounding the expanded metal apertures 52. In this manner, a sheet of expanded metal, as set forth herein, may be seen to present a dual face of filmed over and entrapped liquid. The liquid exposure may be seen to be of a degree not heretofore possible. The amount of liquid entrainment is, in essence, a complete magnitude greater than conventional corrugated plates incorporating simple aperture formation for flow diversion. In this manner, the ascending vapor flow, countercurrent to the liquid flow, is literally channeled into turbulent flow patterns by the offset presence of the liquid 43 about the twisted lattice 4 comprising the expanded metal grid. This feature greatly promotes mass and heat interchange between the vapor and liquid.

Still referring to FIG. 7, it may be seen that the twisted lattice 84 likewise affords multiple flow paths for descending liquid. It may be seen again by way of arrows 92 illustrating the descending liquid flow that the fluid is likewise channeled into, through, and around the sidewalls and upper edges 54 of the various expanded lattice apertures 52. Vapor 37 is likewise diverted into the edges of the apertures 52 where liquid 43 is entrapped in the sidewall channels 90 of the adjacent laminates.

Figure 8:
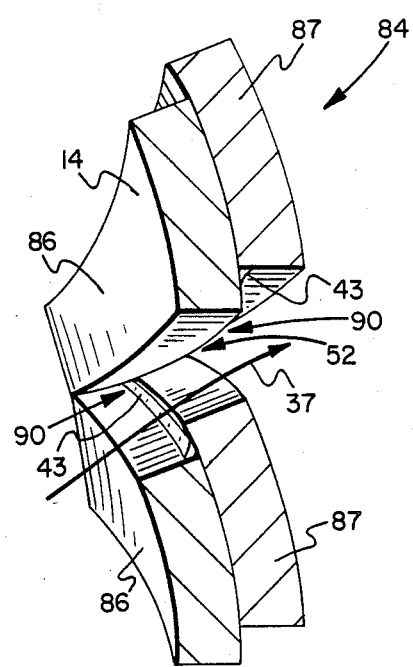
FIG. 8 is a side-elevational, cross-sectional, fragmentary view of a portion of the expanded metal lattice of FIG. 7 illustrating the laminate construction thereof.

Referring now to FIG. 8, there is shown a fragmentary side elevational view of an enlarged aperture section 52 with upper and lower channels 90 clearly shown. Laminate plates 86 and 87 are offset, one to the other, from the expansion during formation. Liquid 43 is shown entrained within upper and lower channels 90. Vapor 37 passing over the plate 14 may even pass through the aperture 52 to contact the liquid entrainment therein. Even when vapor 37 does not pass through the aperture 52, the presence of entrained liquid 43 enhances the flow of descending liquid thereover and through the lattice 84 to effect the circular flow patterns discussed above. Such flow patterns and fluid presence are integral to maximum vapor-liquid contact efficiency.

Referring now to FIGS. 9 through 17 collectively, there are shown various embodiments of the aperture and/or tab construction provided in the plates 14 or notional plane lamella 18. It should be understood that the plates or lamella shown in FIGS. 9 through 17 may be constructed of either solid, smooth, textured, slitted, or expanded metal configurations although solid configurations are shown in each of the drawings for purposes of clarity.

Figure 9:
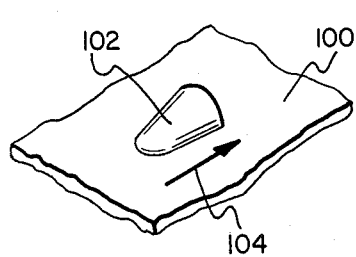
FIG. 9 through FIG. 17 are alternative embodiments of sidewall flow apertures formed in the sidewall of an expanded metal plate adapted for imparting turbulence to the vapor-liquid flow passing thereover.
Figure 10:
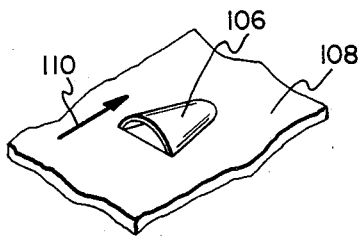

Addressing first the slotted configuration of FIG. 9, there is shown a plate section 100 having a tabbed aperture 102 formed therein and oriented to the direction of fluid flow shown by arrow 104. The tabbed aperture of FIG. 9 is comprised of a slitted and coined portion which protrudes outwardly from the plane of the plate 100 in a semi-conical configuration for diverting the flow of vapor and liquid and imparting turbulence to the flow. Similarly, FIG. 10 is shown comprising a tabbed aperture 106 upon a lamella section 108 with the direction of fluid flow shown by arrow 110. It may be seen that fluid flowing in the direction 110 will be received into the tabbed aperture 106 and channeled therethrough into the opposite side of the lamella 108. Likewise, the various tabbed apertures shown herein may be provided upon either the corrugated plates 14 of the present invention or upon the insert lamella 18. In these various tab structure configurations, the fluid flow parameters and operational characteristics may be selectively altered for precise flow characteristics and the particular constituents used within a process column 30. For this reason a variety of tabbed apertures are shown herein illustrating the varieties of fluid flow and turbulence which may be generated.

Figure 11:
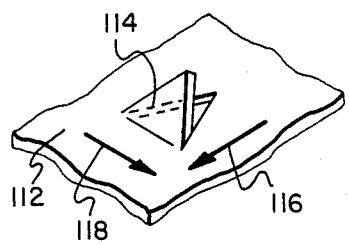
Figure 12:
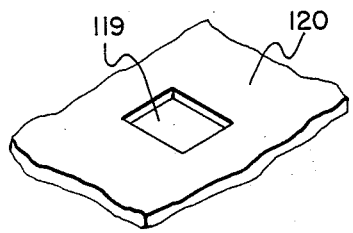
Figure 13:
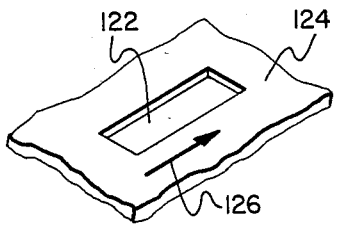
Figure 14:
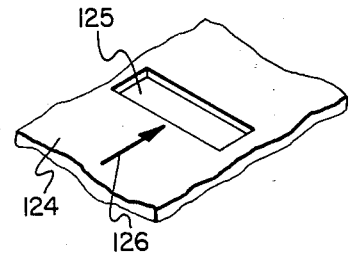

Referring now to FIG. 11 there is shown a plate 112 having a triangular, tabbed aperture 114 formed thereon. Fluid flow in the direction shown by arrow 116 will be received within the triangular tabbed aperture while flow laterally thereto, in the direction show by arrow 118, may be partially diverted and partially received within the aperture. Likewise FIG. 12 illustrates a generally square aperture formed without a tabular region within a plate 120. The square aperture 119 has various fluid flow diverting characteristics contrasting that of a circular aperture and that of a aperture having a tabbed region upstanding therefrom. FIG. 13 illustrates a rectangular aperture positioned longitudinally to the direction of flow. The rectangular aperture 122 formed upon plate 124 is oriented for diverting longitudinal flow as shown by arrow 126. In this configuration, flow is substantially diverted and that which proceeds into the aperture may be carried to the opposite side of the plate 124. The advantages of such cross fertilization from one side to the other side of the flow plates has been set forth above. Addressing now FIG. 14, the plate 124 is shown with a rectangular aperture 125 of equivalent size to that shown in FIG. 13 but oriented generally orthogonal thereto for imparting a substantially different fluid flow effect to a fluid flow propogating in the direction of arrow 126.

Figure 15:
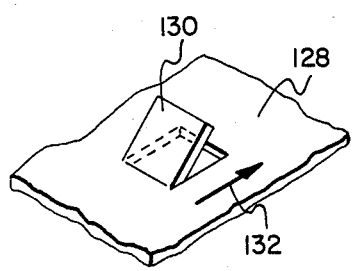

Referring now to FIG. 15 there is shown a plate 128 having a generally rectangular tabbed aperture 130 formed therein. Fluid flowing in a first direction 132 may be seen to be diverted substantially by said tabbed aperture 130 as shown in FIG. 11. However, again the fluid diverting effects are considered in conjunction with the fluid circulating effects for fluid received through the aperture into the opposite side of the plate 128.

Figure 16:
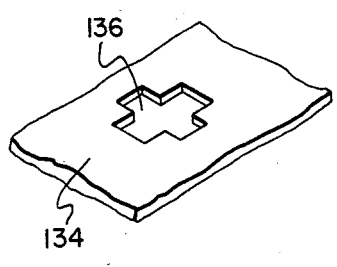
Figure 17:
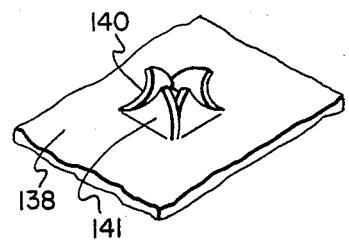

Referring now to FIG. 16 there is shown a plate 134 having a cross shaped aperture 136 received therein. The aperture 136 is capable of diverting various directions of fluid flow much like a circular aperture but with the capability of retaining various fluid accumulations along the corners thereof. Finally, addressing FIG. 17 there is shown a plate section 138 having a tabbed aperture 140 comprised of a plurality of flanged regions 141 folded outwardly of the tabbed 140 for substantially diverting and preventing the transfer of liquid therethrough but permitting the passage of vapor. Such an aperture may be advantageous for certain vapor liquid and/or mass heat exchange characteristics desired for certain chemical reactions in a process column.

Figure 18:
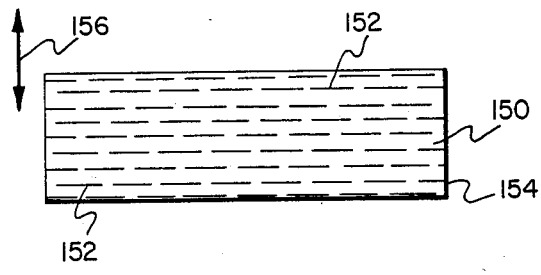
FIG. 18 is a top plan view of a material blank adapted for forming the corrugated plate of the present invention and being constructed with a plurality of staggered slits.

Referring now to FIG. 18 there is shown a top plan view of a material blank comprised of slit construction and adapted for utilization in the present invention. The slitted construction includes a plurality of elongate slits 152 formed in parallel rows and which are in longitudinal spaced relationship one to the other. The slits 152 in adjacent rows are offset and staggered one to the other along a longitudinal direction into alignment with spaces between the slits for affording a laminar fluid flow when disposed in a vertical configuration. The plate 150 of FIG. 18 includes slits 152 which are formed through solid surfaces of the sheet 150 in rows 154 which are generally in parallel spaced relationship and which may be expanded through stretching in the direction of arrow 156. The material may also be provided in a slit or slotted configuration for use as a lamella 18 to be disposed within the notional plane between adjacent and corrugated plates 14. Likewise the configuration shown in FIG. 18 may be used in the embodiment shown therein as a plate construction for the corrugated assembly of plate 14. The slits or slots 152 formed therein may be seen to provide various advantageous capillary effects and lateral entrainment of the liquid descending thereacross for purposes of vapor liquid interface reaction.

Figure 19:
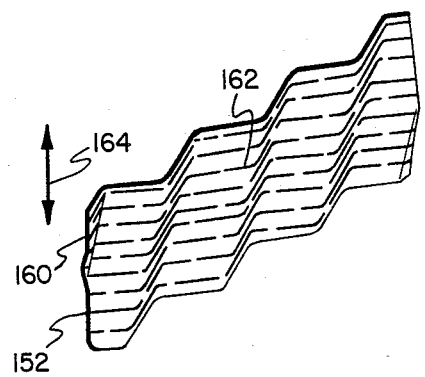
FIG. 19 is a perspective view of an alternative embodiment of the expanded metal corrugated plate of the present invention comprising a non-expanded slitted metal blank.

Referring now to FIG. 19 the material blank of FIG. 18 is shown in a crimped and/or corrugated configuration. The slits 152 of the corrugated plate 160 shown in FIG. 19 extend transversely across a plurality of corrugations of 162 and are capable of diverting fluid flow or the construction of expanded corrugated plates by vertical expansion in the direction of arrow 164. It is conventional in the prior art to expand metal by first slitting and/or slotting said metal by forming and/or coining and then expanding said metal. Various steps in the coining, expanding, slitting and slotting processing steps may be altered for a particular flow configuration. As set forth above, the particular twisted and turned land configuration resulting from slitting and slotting has various advantages heretofore unavailable in prior art configurations for vapor liquid contact towers.

Figure 20:
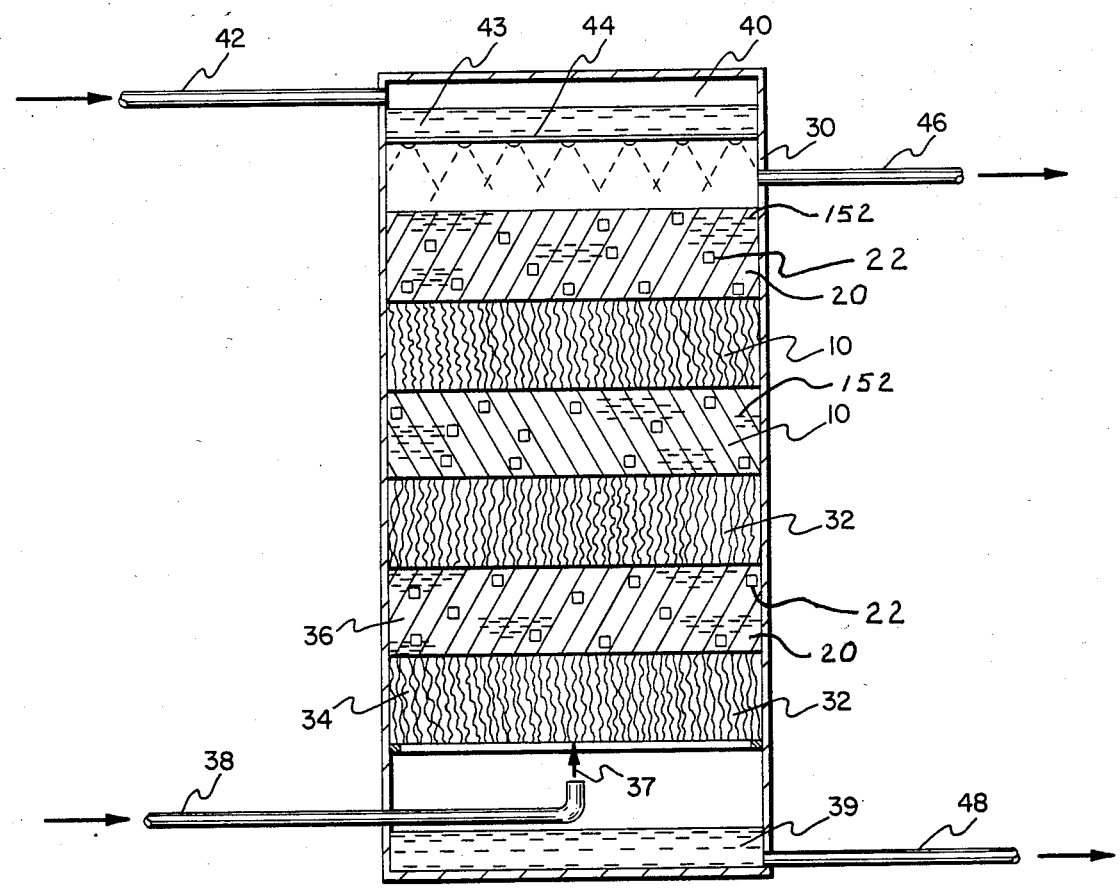
FIG. 20 is a side-elevational, cross-sectional view of a process tower having installed therein a plurality of grid layers constructed of one embodiment of the corrugated contact plate of the present invention and illustrating a plurality of rectangular flow aperatures formed therethrough in accordance with the principles of the present invention.

Referring now to FIG. 20 there is shown a process column 30 having the equivalent input and output vapor and liquid process lines 38 and 42, as set forth above for the processing of ascending vapor with counter-current descending liquid flow therethrough. The process column 30 is shown with a plurality of packing element assemblies 10 comprising grid layers 32 having the angulated corrugated plates 14 disposed therein with rectangular orifices 22 and elongate slits 152 shown through said corrugated plates for purposes of illustration. It may be seen that the rectangular orifices 22 are shown disposed in similar position to the circular orifices 22 set forth above in FIG. 4 and the elongate transversely extending slits 152 are disposed similar to the expanded apertures 20. However, the flow characteristics and chemical reactions concommitedly provided by such variations and process tower construction and flow characteristics may be shown to enhance the specific vapor liquid contact parameters necessary for select chemical reactions. Likewise, the orientation of the tabular aperture configurations shown in FIGS. 9 through 17 have been shown to be particularly useful in "tuning" a process tower corrugated plate and/or lamella configuration for specific vapor liquid contact operation. By utilizing these parameters and the teachings of the present invention, the process tower of the prior art may be utilized in an enhanced and much efficient configuration whereby specific flow configurations and turbulence levels may be interfaced with known laminar boundary characteristics for a particular grid array. With such flow characteristics and the developed parameters for the various tabular orientations relative to the corrugated expanded metal and/or plate materials incorporated into process tower, numerous advantages may be experienced with regard to operational environments.

It is thus believed that the operation and construction of the present invention will be apparent from the foregoing description. While the method and apparatus shown and described has been characterized as being preferred it will be obvious that various changes and modifications may be made therein without departing from the spirit and scope of the invention as defined in the following claims.

We claim:

1. An improved tower packing of the type comprising a plurality of corrugated unexpanded metal sheets in face-to-face contact with opposed corrugations inclined oppositely one to the other for receiving a descending liquid flow concomitantly with an ascending vapor flow to bring about vapor-liquid contact therebetween for mass and/or heat transfer, wherein the improvement comprises a plurality of apertures formed in said sheets for affecting the flow of vapor and liquid therealong and within the corrugations of adjacent sheets, a portion of said apertures being a plurality of relatively small spaced apart slits formed through solid surfaces of each sheet and another portion of said apertures being relatively large orifices spaced apart by said solid surfaces for enabling vapor and liquid to flow to opposite sides of said sheets, said slits being uniformly distributed, elongated, and their longitudinal axes extending transversely to the corrugations, the total area of all of said slits being smaller than the total area of said solid surfaces, each of said spaced apart slits being formed in said metal sheet with relatively small tab regions comprising twisted land areas bent outwardly therefrom.

2. The improvement as set forth in claim 1 wherein said small, elongated, transversely extending slits are formed in said sheets longitudinally spaced from one another in generally parallel rows.

3. The improvement as set for in claim 2 wherein said slits are formed with the slits in adjacent rows being longitudinally offset from one another into alignment with the spaces between the adjacent slits in a staggered array configuration.

4. The improvement as set forth in claim 1 wherein said opposed corrugations are inclined generally orthogonally one to the other and said elongated slits extend perpendicularly to the axis of the column.

5. The improvement as set forth in claim 1 wherein said elongated slits extend perpendicularly to the axis of the column.

6. The improvement as set forth in claim 1 wherein each of said elongated slits includes a coined portion protruding outwardly from the plane of said sheet and extending from said slit in the direction of liquid flow along said sheet.

7. The improvement as set forth in claim 6 wherein said elongated slits are formed in said sheets longitudinally spaced from one another in generally parallel rows.

8. The improvement as set forth in claim 7 wherein the coined portions of the slits in alternate rows protrude outwardly from the plane of said sheet in opposite directions.

9. An improved method of improving vapor liquid contact within a process tower of the type comprising the steps of providing a generally vertical tower having means for ingressing the flow of vapor at the lower region thereof and means for ingressing a stream of liquid at the upper region thereof and a series of layers of grid sections comprising generally vertically oriented corrugated sheets of unexpanded material with the corrugations of adjacent sheets being inclined one to the other between said liquid and vapor ingressing means for receiving the descending flow of liquid and the ascending flow of vapor concomitantly therethrough, said improvement comprising the steps of providing said corrugated sheets with a plurality of parallel, elongate, spaced apart slits formed through solid surfaces of each sheet with the total area of all of said slits being smaller than the total area of said solid surfaces, providing said slitted sheets with a plurality of relatively larger apertures spaced apart by said solid surfaces for effecting the flow of vapor and liquid therealong and within the corrugations of said adjacent sheets for enhancing the vapor liquid interaction, and the further step of orienting the longitudinal axes of said elongate slits in said sheets to extend generally transversely to said vapor liquid flow and said corrugations for imparting turbulence thereto along with a transverse spreading effect to the liquid flowing down and through said sheets.

10. The method as set forth in claim 9 wherein said method further includes providing said elongate transversely extending spaced apart slits in adjacent parallel rows with each slit being in alignment with a space between slits in the adjacent row to enhance the spreading effect to the liquid flowing down said sheet.

11. An improved tower packing of the type comprising a plurality of corrugated sheets of unexpanded material in face-to-face contact with corrugations of adjacent sheets being oppositely inclined one to the other for receiving a descending liquid flow concomitantly with an ascending vapor flow to bring about vapor-liquid contact therebetween for mass and/or heat transfer and wherein said corrugated sheets include a plurality of relatively large orifices spaced apart by solid surfaces of each sheet for vapor pressure equalization and liquid flow diversion between adjacent corrugation channels, wherein the improvement includes a plurality of apertures smaller than said orifices formed through said solid surfaces of said sheets, the total area of all of said apertures being smaller than the total area of said solid surfaces, said apertures comprising elongate slits spaced longitudinally from one another in parallel rows with the longitudinal axes of said apertures extending transversely across said corrugations to distribute liquid across both sides of said sheets and provide lateral diversion and entrainment of liquid descending over said sheets to spread the liquid across the surface area of said sheets and produce enhanced vapor-liquid contact.

12. The improvement as set forth in claim 11 wherein the slits in adjacent rows are longitudinally offset from one another into alignment with the spaces between the slits.

13. The improvement as set forth in claim 11 wherein each of said elongate slits includes a coined portion protruding outwardly from the plane of said sheet and extending from said slit in the direction of liquid flow along said sheet.

14. The improvement as set forth in claim 13 wherein the coined portion of the slits in alternate rows protrude outwardly from the plane of said sheet in opposite directions.

15. A tower packing comprising a plurality of sheets of unexpanded material, a plurality of corrugations formed on each sheet, said sheets being disposed in face-to-face contact with the corrugations of each sheet extending at an angle to the corrugations of its adjacent sheets to define flow paths for a descending liquid and an ascending vapor, a plurality of relatively large orifices formed through and spaced apart by solid surfaces of each sheet for permitting passage of said liquid and vapor therethrough to distribute the liquid over said sheets and equalize the pressure of said vapor, and a plurality of relatively small elongated slits formed through the solid surfaces of each of said sheets, the slits in each sheet being spaced longitudinally from each other in parallel rows with the longitudinal axes of said slits extending transversely across said corrugations, the total area of all of said slits being smaller than the total area of said solid surfaces, a portion of each sheet adjacent each slit being displaced from the plane of said sheet, to enhance vapor-liquid contact along said sheets.

16. The packing as set forth in claim 15 wherein said slits include a coined portion protruding outwardly from the plane of said sheet and extending from said sheet in the direction of liquid flow along said sheet.

17. The packing as set forth in claim 16 wherein the coined portion of the slits in alternate rows protrude outwardly from the plane of said sheet in opposite directions.

18. The packing as set forth in claim 15 wherein said slits include a coined portion protruding outwardly from the plane of said sheet and extending from said sheet in a direction opposite to the direction of liquid flow along said sheet.

* * * * *